US006323478B1

United States Patent
Fujisaki et al.

(10) Patent No.: US 6,323,478 B1
(45) Date of Patent: Nov. 27, 2001

(54) PHOTOVOLTAIC POWER GENERATION ROOF AND INSTALLATION METHOD THEREOF

(75) Inventors: Tatsuo Fujisaki, Nara; Satoru Shiomi, Tanabe; Makoto Sasaoka, Tanabe; Hidehisa Makita, Tanabe; Shigenori Itoyama, Nara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/179,836

(22) Filed: Oct. 28, 1998

(30) Foreign Application Priority Data

Oct. 30, 1997 (JP) .................................................. 9-298796

(51) Int. Cl.$^7$ ...................................................... H01J 40/14
(52) U.S. Cl. ................................ 250/214 SG; 250/203.4; 136/291
(58) Field of Search .......................... 250/214 SG, 214.1, 250/214 R, 203.4; 363/98, 27, 132, 17; 323/906; 315/86; 307/64; 136/291, 293

(56) References Cited

U.S. PATENT DOCUMENTS 3,952,324 * 4/1976 Wolff et al. .................... 250/203.4
5,232,518 8/1993 Nath et al. ....................... 136/251
5,576,533 * 11/1996 Tantraporn ..................... 250/214 R
5,590,495 1/1997 Bressler et al. .................. 52/173.3

FOREIGN PATENT DOCUMENTS 9-199747   7/1997   (JP) .

OTHER PUBLICATIONS

Patent Abstracts of Japan, vol. 1997, No. 11, Nov. 28, 1997 (corresponds to JP 09–199747).
Patent Abstracts of Japan, vol. 1997, No. 03, Mar. 31, 1997 (corresponds to JP 08–288533).

* cited by examiner

Primary Examiner—Que T. Le
(74) Attorney, Agent, or Firm—Fitzpatrick, Cella, Harper & Scinto

(57) ABSTRACT

A solar panel roofing board and a general roofing board are electrically connected directly or indirectly via a clip, spring, vis, and so on. Further, a conductive member is provided between the roofing boards and a roof installation surface, and the roofing boards are connected to the conductive member. Accordingly, potentials of the roof configuring parts of a photovoltaic power generation roof using a solar panel roofing board become the same, thereby making it easy to ground them as well as to select a connection point to the ground. Further, a metal sheet roof provided for securing fire resistance is used to achieve the above object.

18 Claims, 20 Drawing Sheets

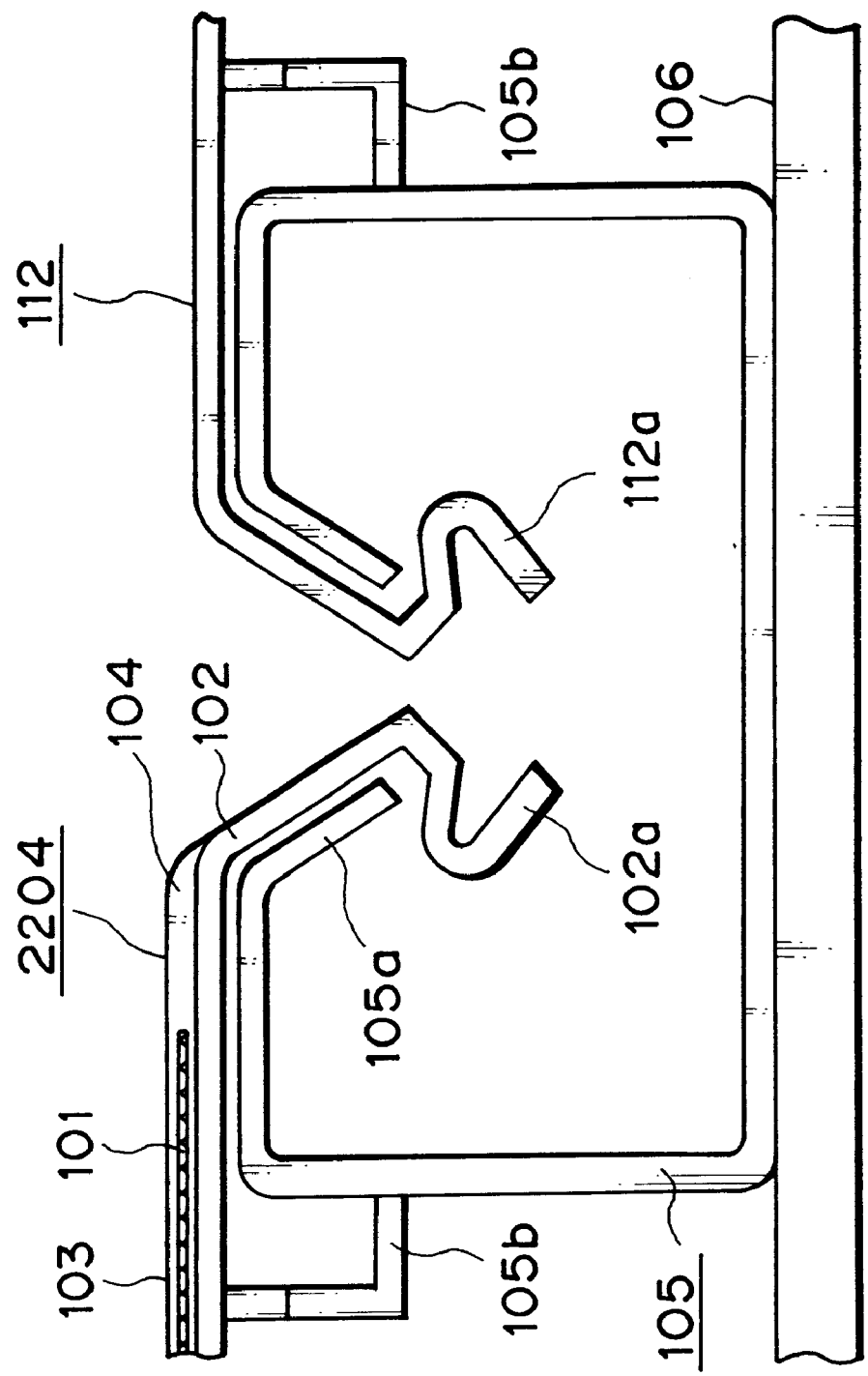

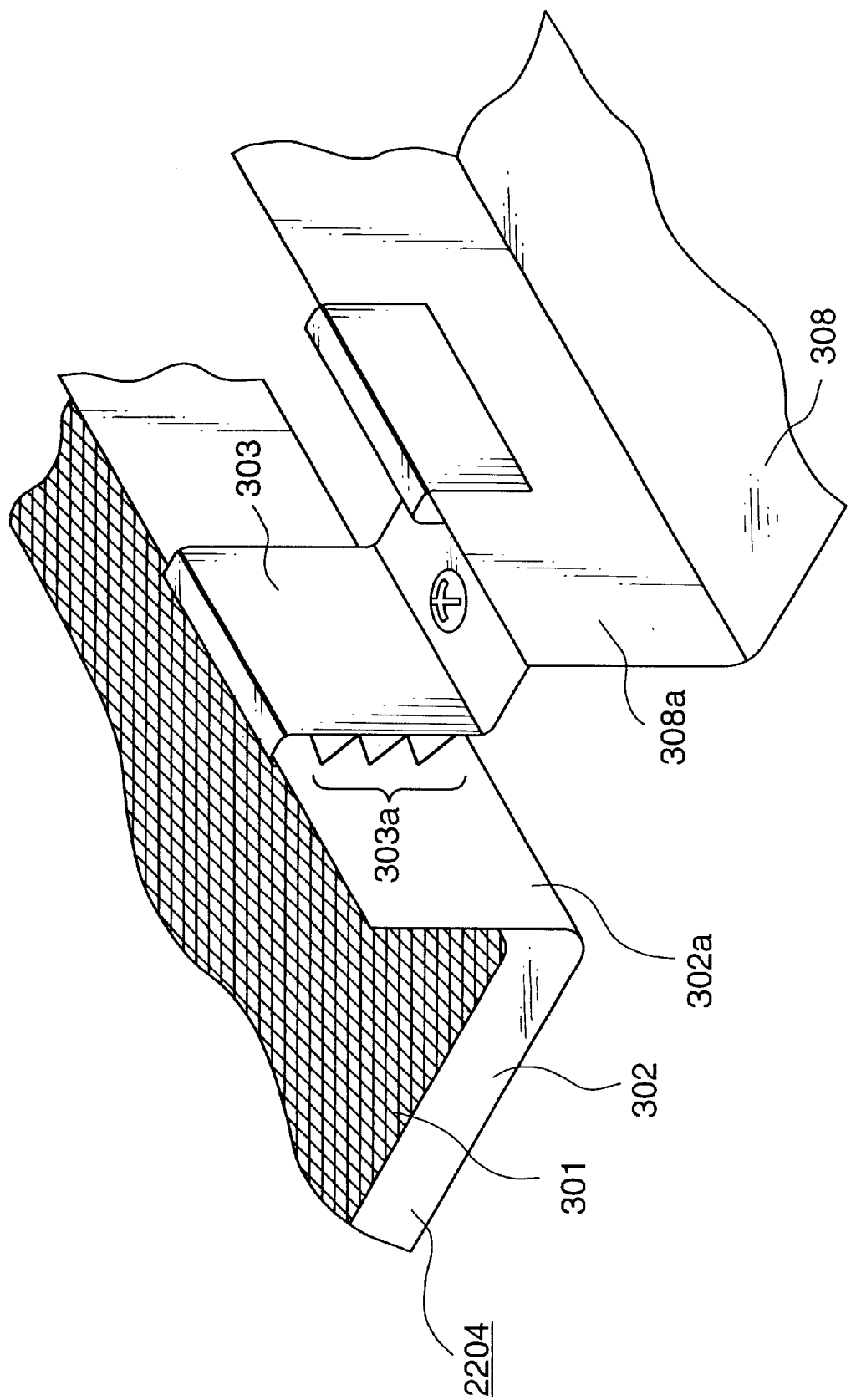

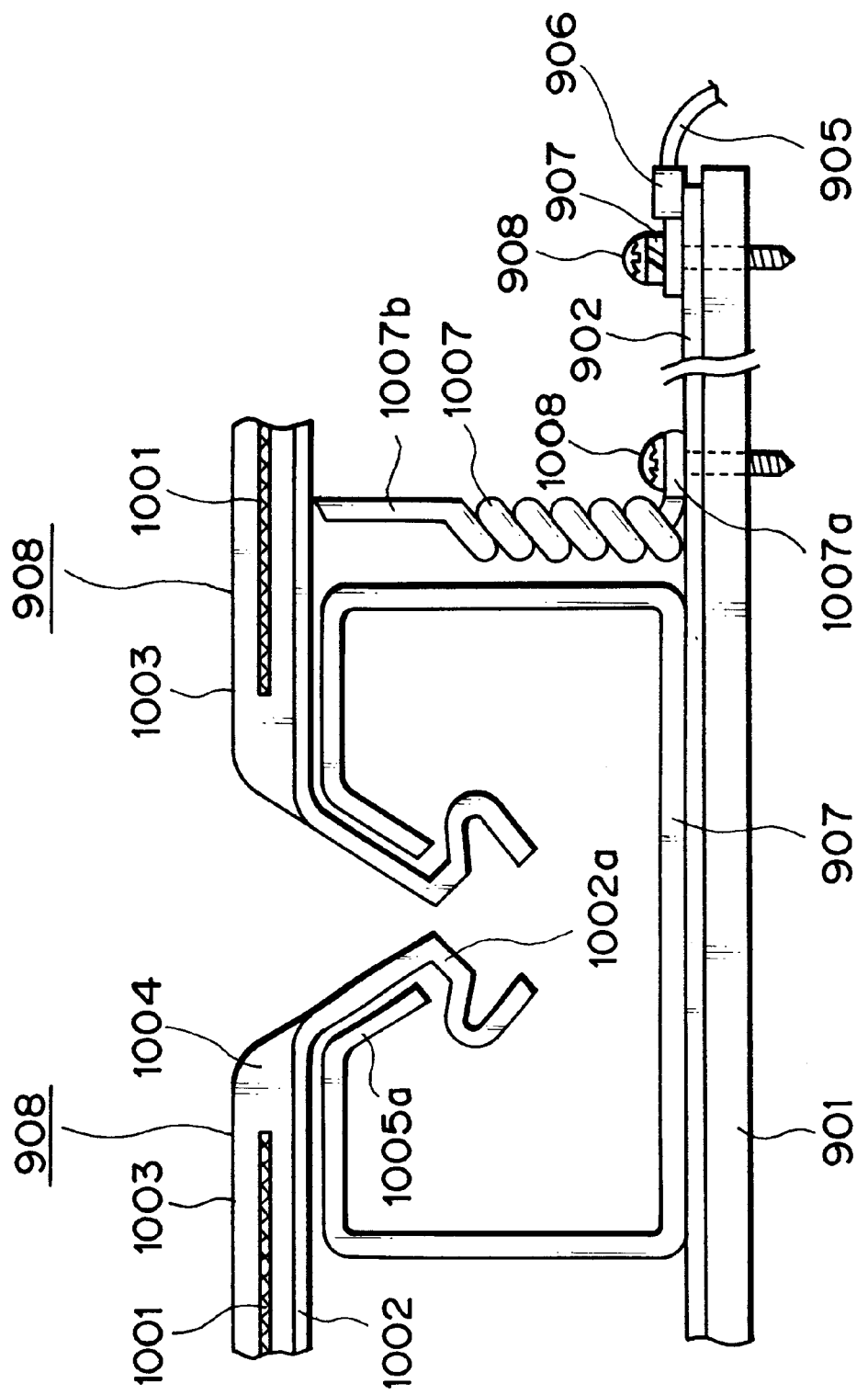

F I G. 16
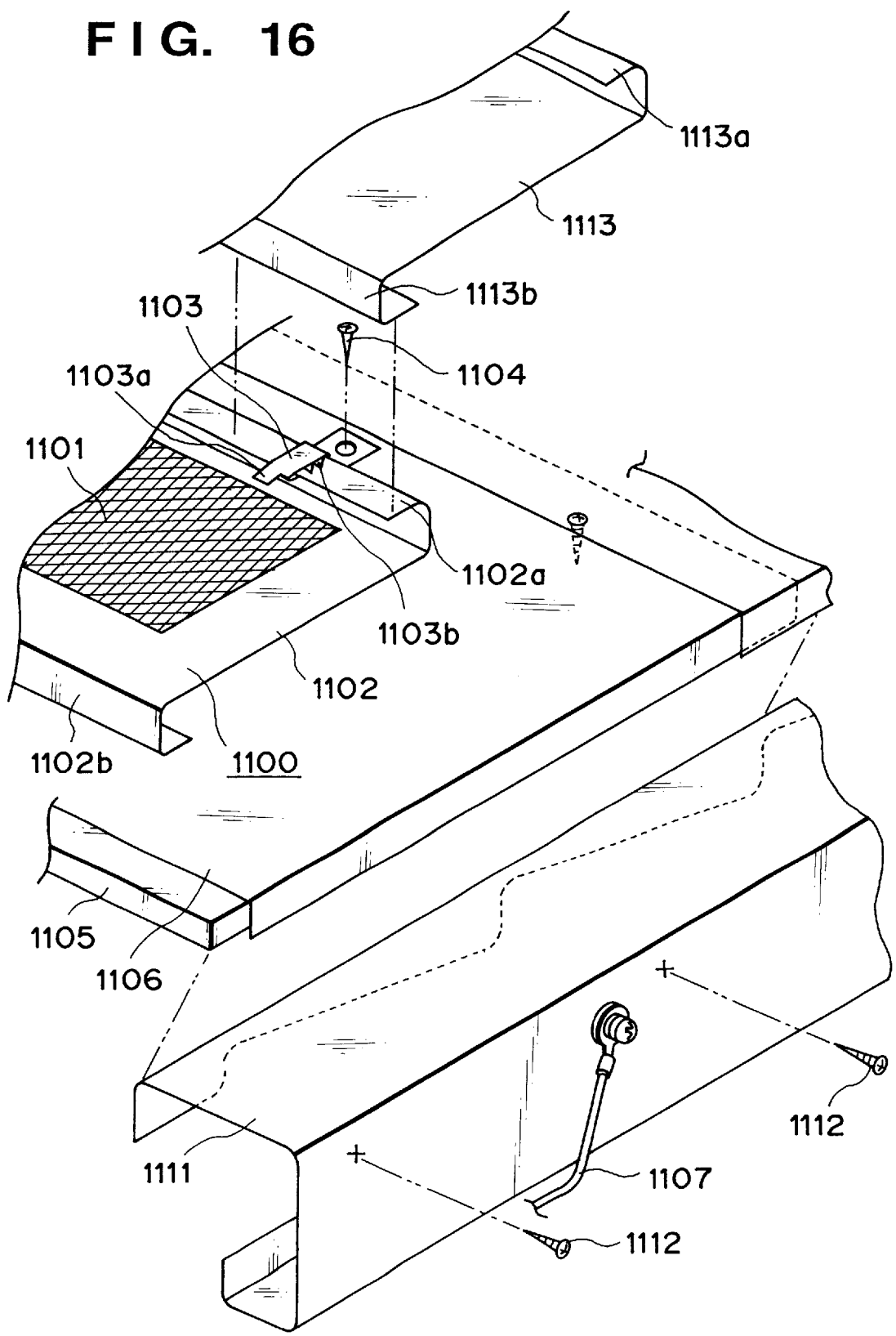

PHOTOVOLTAIC POWER GENERATION ROOF AND INSTALLATION METHOD THEREOF

BACKGROUND OF THE INVENTION

The present invention relates to a photovoltaic power generation roof, or a solar panel roof, and installation method thereof and, more particularly, to an installation method and structure of a photovoltaic power generation roof for installing the photovoltaic power generation roof easily, inexpensively, and electrically safely.

A photovoltaic power generation system utilizing a solar cell, a safe energy source which does not exert a bad influence on the environment, has been gaining the interest of many people. Easier installation, better cost-performance ratio, and better design of a photovoltaic power generation system have been urged; accordingly, a technique relating to a photovoltaic power generation roof which uses so-called solar panel roofing board, roofing boards with integrated solar cells, has been developed in order to replace a conventional installation method for installing a conventional solar panel on a roof.

In a photovoltaic power generation roof which uses he aforesaid solar panel roofing boards, a so-called reverse power flow connection is commonly adopted. In the reverse power flow connection, solar panels of the solar panel roofing boards are electrically connected in series to obtain a relatively high voltage from the connected solar panels 1, and the solar panels 1 are connected to a power system circuit 5 of an electric power company, as shown in FIG. 18. In such a case, a power inverter apparatus 2 (generally called an inverter) having a function of inverting DC (direct current) power into AC (alternating current) power, shaping the voltage waveform of the inverted AC power to that of the power system circuit 5, and providing the shaped AC power to the power system circuit 5 is provided.

For configuring a power generation system connected to a power system circuit of an electric power company in the reverse current connection as described above, it is preferred to ground the outer shell of a solar panel for the sake of electrical safety. Therefore, it is necessary to design a metal sheet and metal frame of the aforesaid solar panel roofing board to have a structure for grounding.

Conventionally, however, is disclosed in Japanese Patent Application laid-open (KOKAI) 9-199747, a solar panel roofing board has been developed while giving priority to performance of a solar panel and performance and design of the roofing board. Active development of a technique for securing electrical safety of the solar panel roofing board easily and inexpensively were left behind.

SUMMARY OF THE INVENTION

The present invention has been made in consideration of the above situation and has as its object to provide a photovoltaic power generation roof and installation method thereof capable of maintaining uniform voltages of roof configuration components of the photovoltaic power generation roof using roofing boards with integrated solar cells.

According to the present invention, the foregoing object is attained by providing a solar panel roof having a portion configured with a first roofing board with integrated solar cells and a portion configured with a second roofing board without any solar cell comprising a conductive member for electrically connecting the first and second roofing boards.

Further, the foregoing object is also attained by a roofing method for a solar panel roof having a portion configured with a first roofing board with integrated solar cells and a portion configured with a second roofing board without any solar cell comprising the step of setting the first and second roofing boards so as to be at the same potential.

With the above configuration, grounding of the photovoltaic power generation roof becomes easy, and a grounding position of the photovoltaic power generation roof can be freely set. Further, a metal sheet roof aimed at improving fire resistance serves to achieve the foregoing object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a cross-sectional view for explaining an installation state of a solar panel roofing board and a general roofing board according to a first embodiment of the present invention;

FIG. 3A is a perspective view for explaining an installation state of a solar panel roofing board and a general roofing board according to a second embodiment of the present invention;

FIG. 10 is a side view for explaining the fourth embodiment of the present invention;

FIG. 16 is a perspective view for explaining an eighth embodiment of the present invention;

DETAILED DESCRIPTION OF THE PREFERRED EMBODIMENTS

Figure 1B:
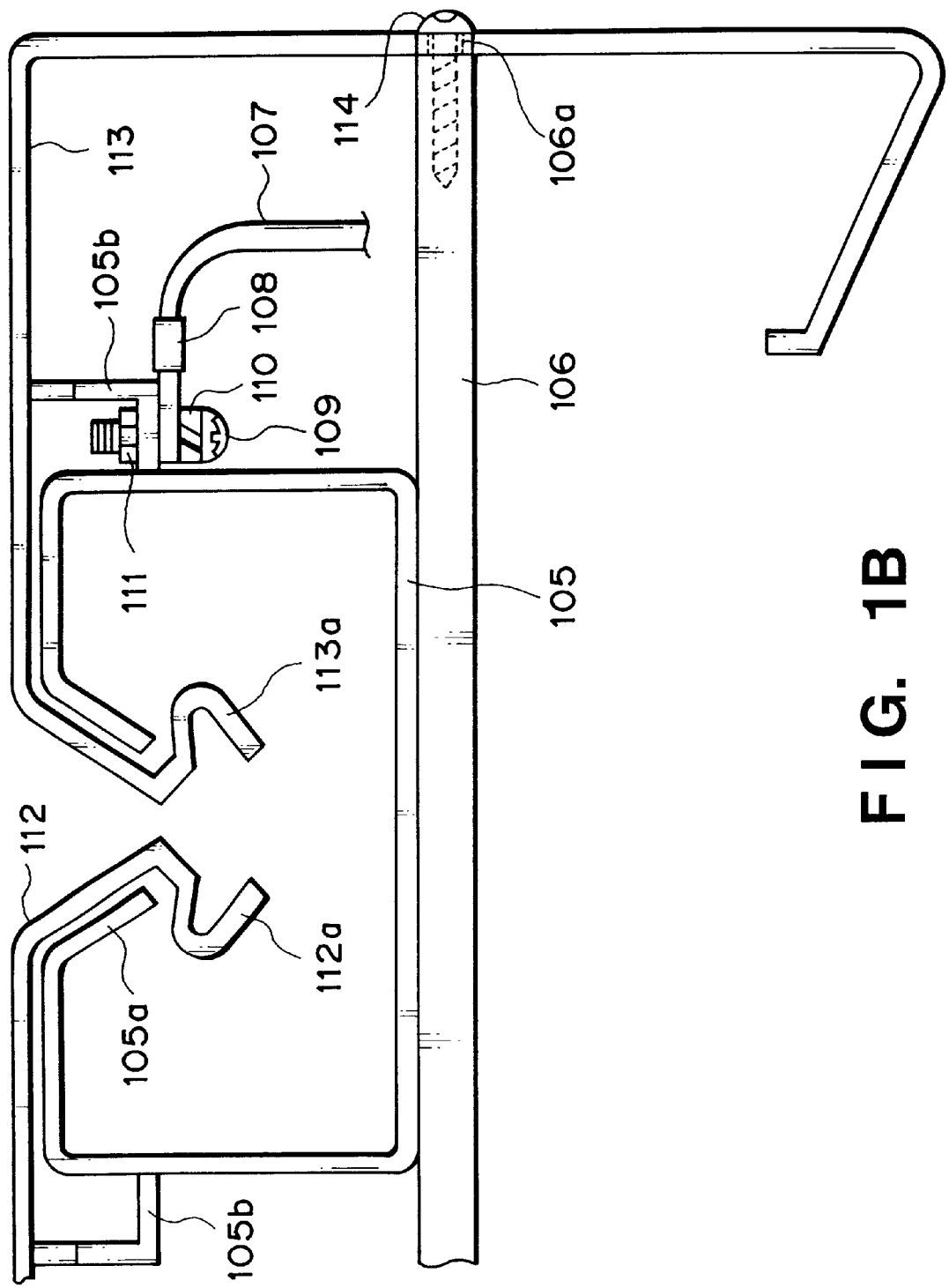
FIG. 1B is a side view for explaining an installation state of a general roofing board and a ground wire according to the first embodiment of the present invention.

A photovoltaic power generation roof and installation method thereof according to the present invention will be described in detail in accordance with the accompanying drawings.

In the present invention, there are two types of roofing boards for configuring a roof: a roofing board with solar cells (referred to as "solar panel roofing board" hereinafter) and a roofing board without any solar cell (referred to as "general roofing board" hereinafter). In the present invention, there are electrical connections between solar panel roofing boards, between general roofing boards, and between a solar panel roofing board and a general roofing board, and the entire roof is at the same potential.

A solar panel roofing board may have an arbitrary shape and structure; however, it must have a conductive portion. Regarding a general roofing board, it may or may not have the same shape as that of the solar panel roofing board; however, it must have a conductive portion.

Connection between roofing boards may be direct electrical connection or indirect electrical connection via a fixing member or via a roof connecting member. Note, for electrically connecting the roofing boards via the fixing member or the roof connecting member, the fixing member or the roof connecting member needs to have a conductive portion. Further, using a member having both functions, i.e., a fixing member and a roof connecting member, can be used in the present invention.

As the fixing member or the roof connecting member, a metal clip, metal spring, and/or metal vis may be used. For connecting roofing boards either directly or indirectly, it is preferable to use a configuration, such as a protuberance, in consideration of electrical connection.

In a structure which has a conductive member between roofing boards and a roof installation surface, the solar panel roofing boards and the general roofing boards are electrically connected to the conductive member. Connection between roofing boards may be direct electrical connection or may be indirect electrical connection via a fixing member or a roof connecting member or both.

Further, it is necessary to consider grounding of the solar panel roofing board, as described above. There is no special limit to the method of taking a ground electrode, for grounding, from the photovoltaic power generation roof; however, it is necessary for the ground electrode to be electrically connected to the members of the photovoltaic power generation roof having the above configuration to insure the same potential. The ground electrode of the present invention comes to have the same potential as that of the general roofing boards; accordingly, the ground electrode of the present invention can be provided at an arbitrary position of the photovoltaic power generation roof.

For instance, a ground electrode may be provided on a fixing member for fixing a roofing board on a roof installation surface, a roof connecting member for connecting roofing boards, a conductive member provided between roofing boards and a roof installation surface, or a general member for covering, e.g., eaves, gable, and ridge. Further, a ground electrode may be provided on a general member, fixing member, roof connecting member, or conductive member which is exposed or can be easily exposed to the outside of the roof.

First Embodiment

Figure 17:
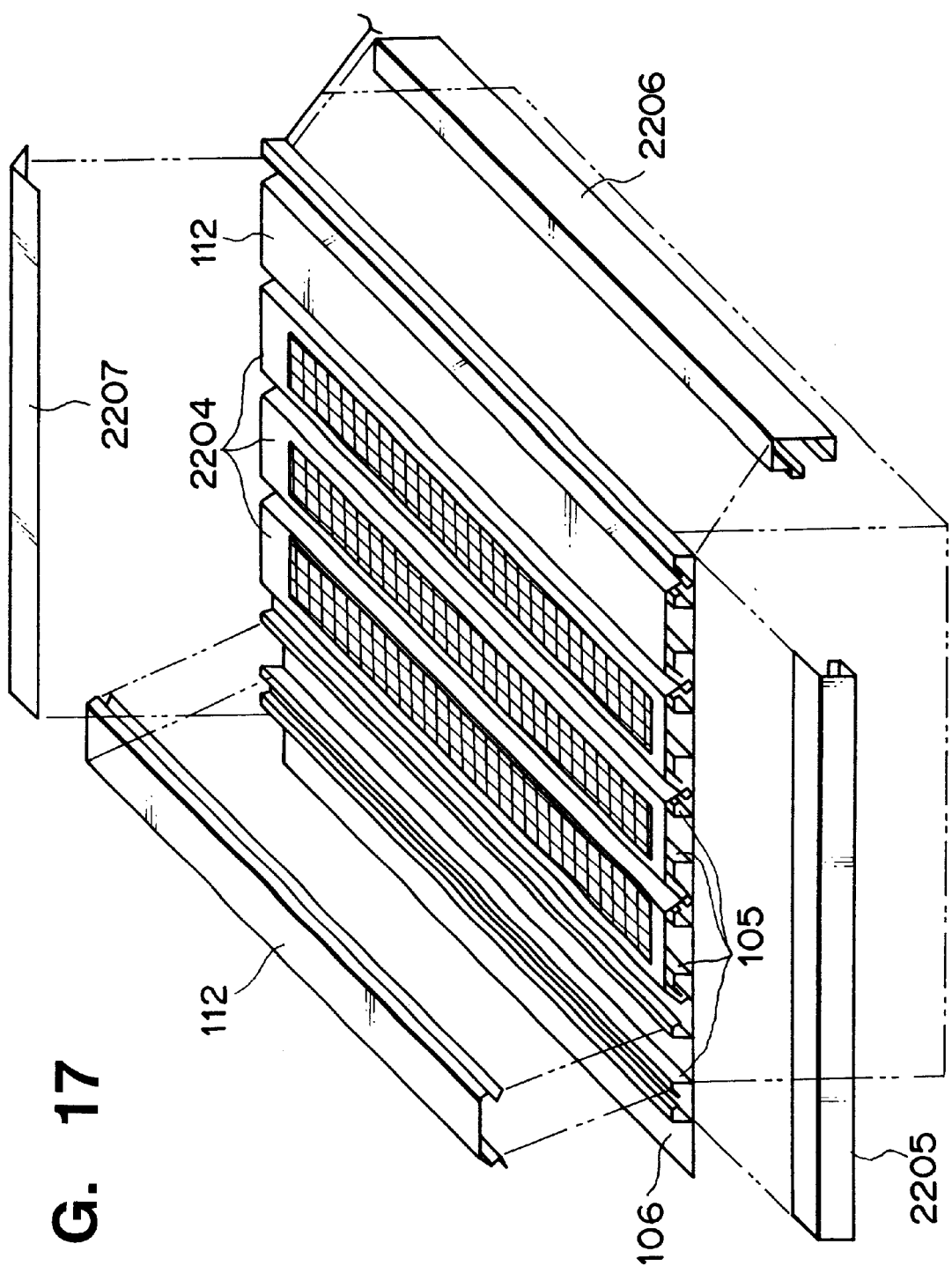
FIG. 17 is a perspective view showing an entire roof according to the first embodiment of the present invention.
Figure 18:
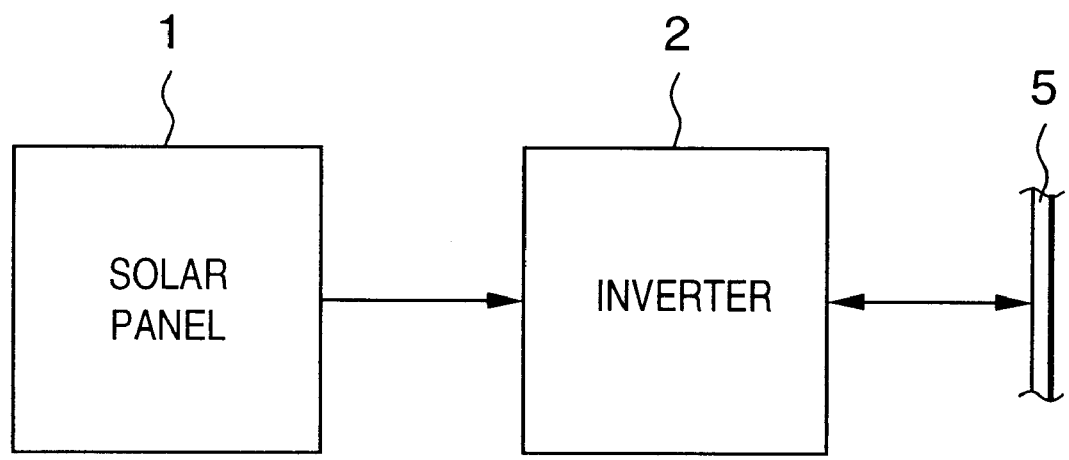
FIG. 18 is a block diagram illustrating a configuration of a photovoltaic power generation system of the system interconnection type.

FIG. 17 is a perspective view showing a photovoltaic power generation roof according to the first embodiment of the present invention. In FIG. 17, reference numeral 106 denotes a roof installation surface, provided on a top of a house, on which roofing boards are set to configure a roof; 105, metal fixing members, provided on the roof installation surface 106, for holding roofing boards; 2204, solar panel roofing boards which are the main configuration of the roof and are engaged with the fixing members 105; 112, general roofing boards, made of metal sheet, having substantially the same shape as that of the solar panel roofing boards 2204; and 2205, 2206, and 2207, general members for covering, arranged around and in connecting portions of the roofing boards, in order to keep the appearance of the roof as well as to provide an ability of, e.g., weathering.

Below, a specific way to make the entire surface of the photovoltaic power generation roof a uniform potential is explained. FIG. 1A is a view showing a border between a portion roofed with the solar panel roofing boards 2204 and a portion roofed with the general roofing boards 112. More specifically, it shows a state in which the solar panel roofing board 2204 and the general roofing board 112 are set to the fixing member 105. On the left hand side of FIG. 1A, the solar panel roofing board 2204 is set, and on the right hand side of FIG. 1A, the general roofing board 112 is set.

In FIG. 1A, a solar cell element 101 is encapsulated between a metal sheet 102 and a light-transmitting protective film 103 with resin filler 104. A curved portion 102a of the metal sheet 102 is arranged symmetrically in both edges of the solar panel roofing board 2204. Further, the fixing member 105 is fixed on the roof installation surface 106 at predetermined intervals. To fix the solar panel roofing board 2204 to the fixing member 105, the curved portion 102a of the solar panel roofing board 2204 deforms elastically as it extends over a bent portion 105a of the fixing member 105 and is settled at a position as FIG. 1A shows.

The general roofing board 112 which does not include a solar cell has substantially the same shape as that of the solar panel roofing board 2204 and also has curved portions 112a on both side edges. The curved portion 112a is engaged with and fixed to the bent portion 105a of the fixing member 105 in the same manner as the curved portion 102a of the solar panel roofing board 2204 is fixed to the fixing member 105.

Figure 2:
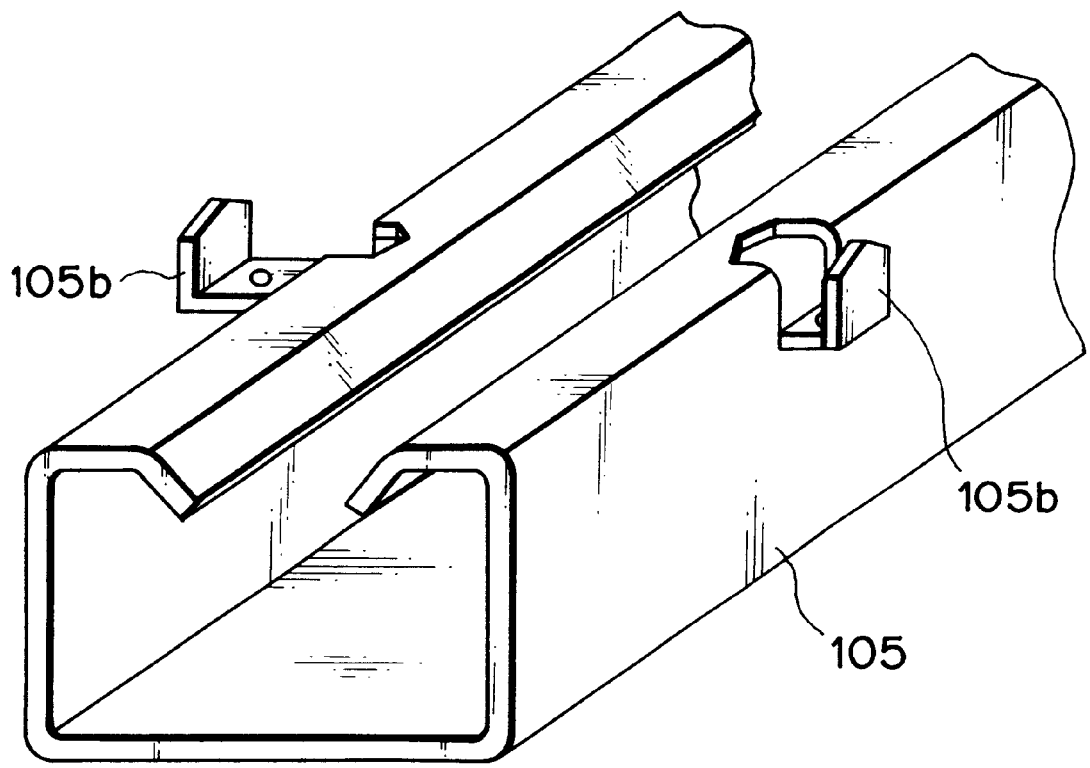
FIG. 2 is a perspective view of a fixing member used in the first embodiment of the present invention.

On both sides of the fixing member 105, contact terminals 105b are formed by stamping-out and bending processes, and when the solar panel roofing board 2204 and the general roofing board 112 Ares fixed on the fixing member 105, the tips of the contact terminals 105b on both sides of the fixing member 105 are respectively pressed against the metal sheet 102 of the solar panel roofing board 2204 and the backside surface of the general roofing board 112. When a painted steel sheet is used as the metal sheet 102, since the tip of the contact terminal 105b is sharp, it breaks the paint film to achieve electrical connection with the painted steel sheet. Note, the inventors of the present invention carried out an experiment using the contact terminals 105b as shown in FIG. 2, ard it is confirmed that sufficient electrical connection is achieved by substantial point connection.

FIG. 1A shows a connecting portion between the solar panel roofing board 2204 and the general roofing board 112; however, the same configuration is also applied to a connecting portion between two solar panel roofing boards 2204.

According to the aforesaid configuration, metal sheets 102 of plural pairs of solar panel roofing boards 2204, and pairs of the solar panel roofing boards 2204 and the general roofing boards 112, arranged on both sides of the fixing members 105, are electrically connected via the fixing members 105; therefore, it is possible to make the entire roof installation surface roofed with the roofing boards be at a uniform potential.

FIG. 1B shows a state in which the general roofing board 112 in the last column and an edge cover 113 are fixed to the fixing member 105, and a ground electrode is arranged on the edge cover.

In FIG. 1B, reference numeral 113 denotes the edge cover and has a curved portion 113a on a side edge. The curved portion 113a is engaged with the bent portion 105a of the fixing member 105. Further, the other side edge which faces the curved portion 113a is bent so as to largely cover the roof installation surface 106 and fixed to a side 106a of the roof installation surface 106 by a vis 114. Further, a round-shaped terminal 108 which is pressed against the end of a ground wire 107 is fixed to a hole on the contact terminal 105b of the fixing member 105 with a spring washer 110, a bolt 109 and a nut 111. Furthermore, although it is not shown, the other end of the ground wire 107 is set to a ground potential in a proper manner.

With the configuration as explained with reference to FIGS. 1A and 1B, the solar panel roofing boards 2204 and the general roofing boards 112, installed on the roof, have the same potential; therefore, a connecting point of the ground wire 107, when grounding via the fixing member 105, may be selected from the fixing members 105 arranged on the roof installation surface 106. Thus, it is possible to freely select a suitable position for designing the roof, such as the fixing member 105 near a hole for drawing a power line of the solar panel into the house or the fixing member 105 near a gable as the connecting point. Therefore, freedom of designing the photovoltaic power generation roof is widened.

Second Embodiment

FIG. 3A shows an example of applying the present invention to a roof using battens, and specifically shows a border between a portion roofed with the solar panel roofing boards 2204 and a portion roofed with general roofing boards 308, where the solar panel roofing board 2204 and the general roofing board 308 are fixed to a fixing member 303.

In FIG. 3A, a solar cell element 301 of the solar panel roofing board 2204 is encapsulated on a metal sheet 302 in a way as will be described later, and, on both side edges of the metal sheet 302, bent portions 302a which are bent upward with the side of the solar cell element 301 facing up are formed. Further, reference numeral 308 denotes the general roofing board which does not have a solar cell and is made of a metal sheet, for instance.

In FIG. 3A, reference numeral 303 denotes the fixing member, made of a metal sheet, for electrically connecting the solar panel roofing board 2204 and the general roofing board 308 and fixing them on the roof installation surface. Among the edges of the fixing member 303, protuberances 303a having sharp tips are formed at edges which contact the bent portion 302a of the metal sheet 302 and the bent portion 308a of the general roofing board 308; accordingly, the solar panel roofing board 2204 and the general roofing board 308 are fixed on the roof installation surface, and the protuberances 303a pressed against the bent portion 302a of the metal sheet 302 and the bent portion 308a of the general roofing board 308 achieve electrical connection.

Figure 3B:
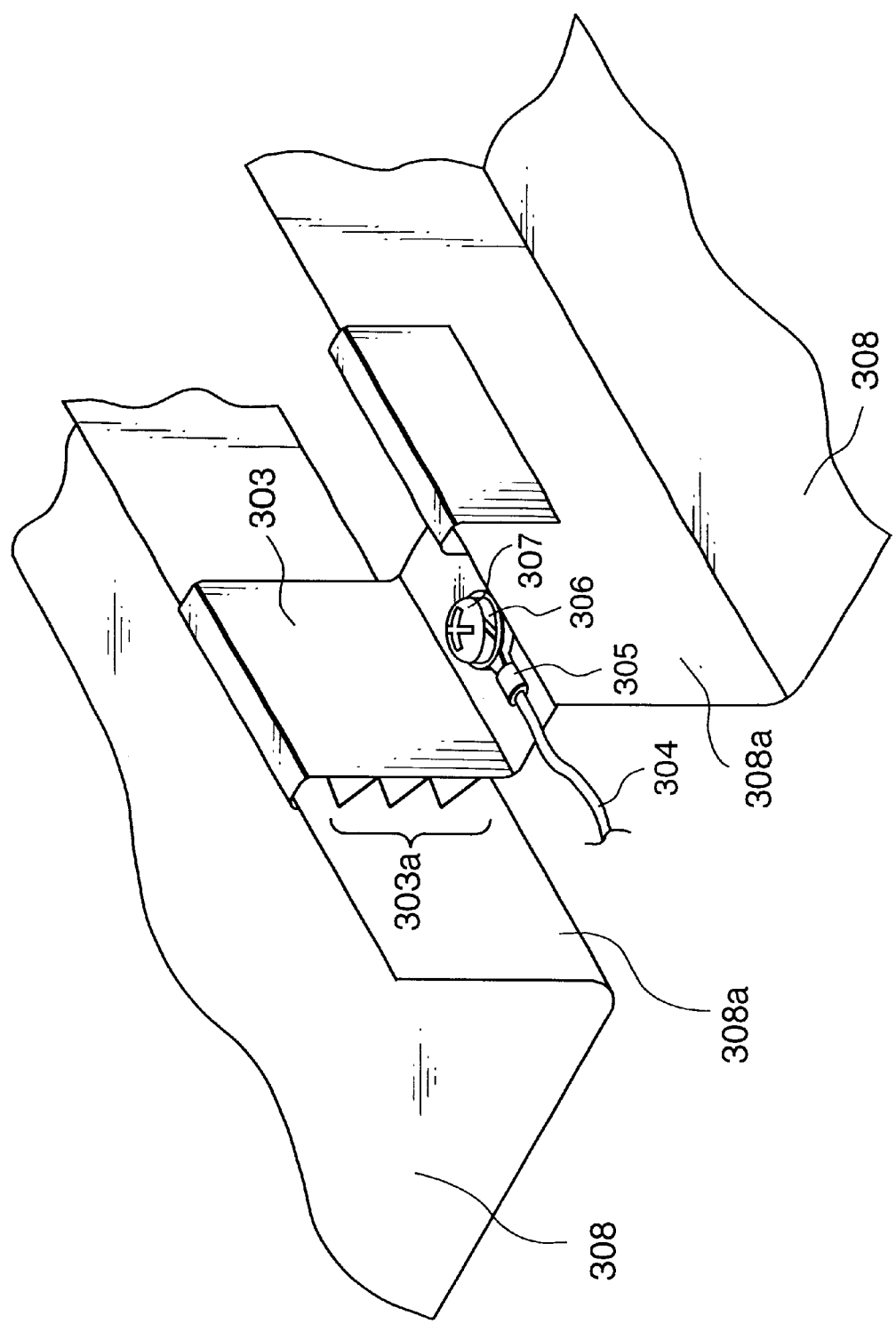
FIG. 3B is a perspective view for explaining an installation state of a general roofing board and a ground wire according to the second embodiment of the present invention.
Figure 4:
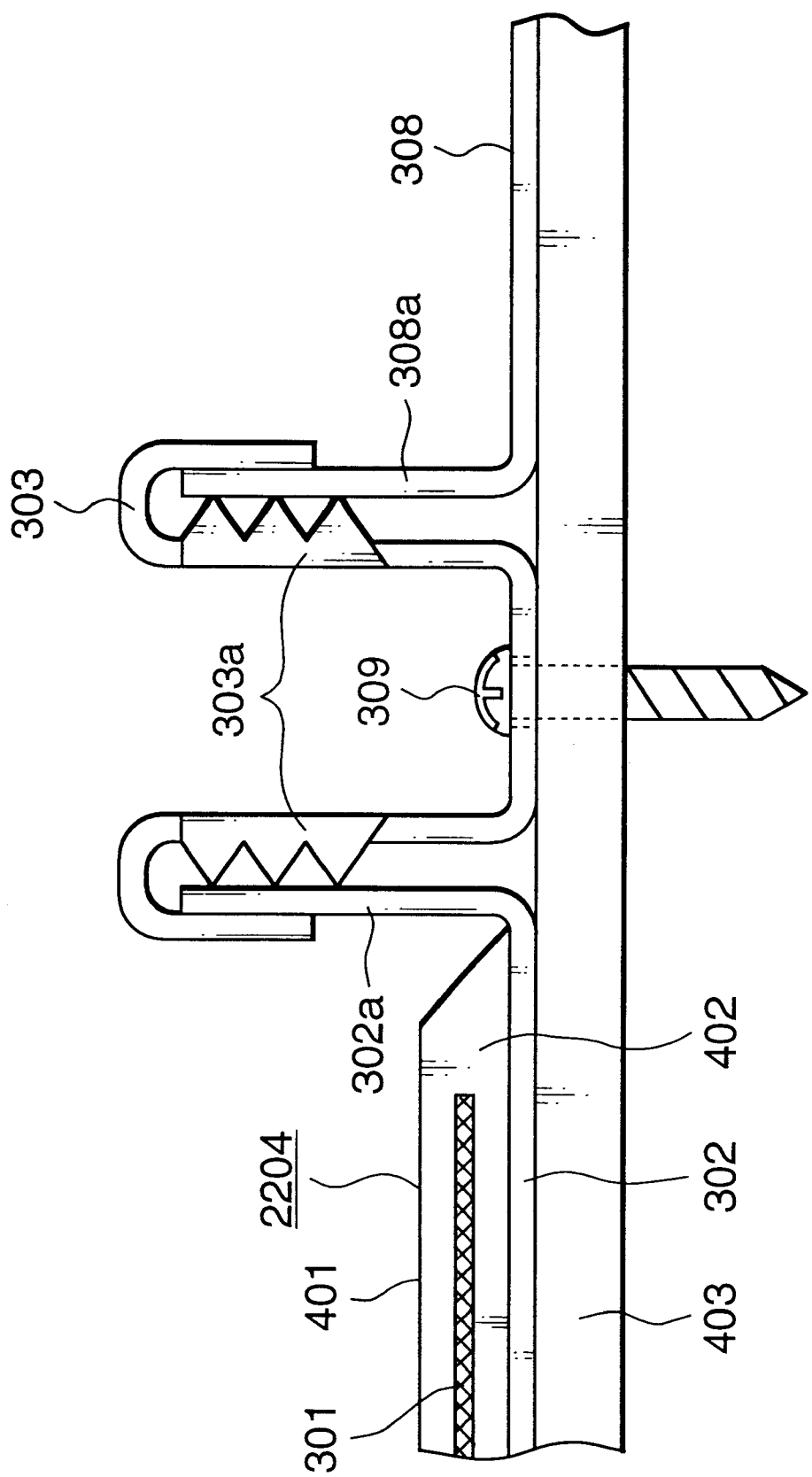
FIG. 4 is a side view showing the details of FIGS. 3A and 3B.

FIG. 4 is a cross-sectional view of the configuration shown in FIG. 3A. Referring to FIG. 4, the solar cell element 301 is encapsulated between the metal sheet 302 and a light-transmitting protective film 401 with resin filler 402. The bent portions 302a formed on both side edges of the metal sheet 302 are fixed on the roof installation surface 403 with the fixing member 303 and a vis 309. At the same time, the protuberances 303a of the fixing member 303 are pressed against the bent portion 302a, thereby the solar panel roofing board 2204 and the fixing member 303 come to have the same potential. Similarly, other protuberances 303a formed on the fixing member 303 are pressed against the bent portion 308a of the general roofing board 308 to also achieve electrical connection. With the above configuration, the metal sheet 302 of the solar panel roofing board 2204 and the general roofing board 308 on both sides of the fixing member 303 are electrically connected via the fixing member 303.

FIG. 3B shows a connection state of the general roofing boards 308 set on the right of the portion shown in FIG. 3A and a ground electrode arranged between the general roofing boards 308. FIG. 3B differs from FIG. 3A in that the general roofing boards 308 are set on both sides of the fixing member 303, and the ground wire 304 is connected and fixed to a hole in the fixing member 303 with a round-shaped terminal 305, a spring washer 306, and a vis 307.

Accordingly, a plurality of solar panel roofing boards 2204, a plurality of general roofing boards 308 having the same shape as the solar panel roofing boards 2204, and the fixing members 303 are electrically connected and have the same potential, especially ground potential via the ground wire 304.

Third Embodiment

Figure 5:
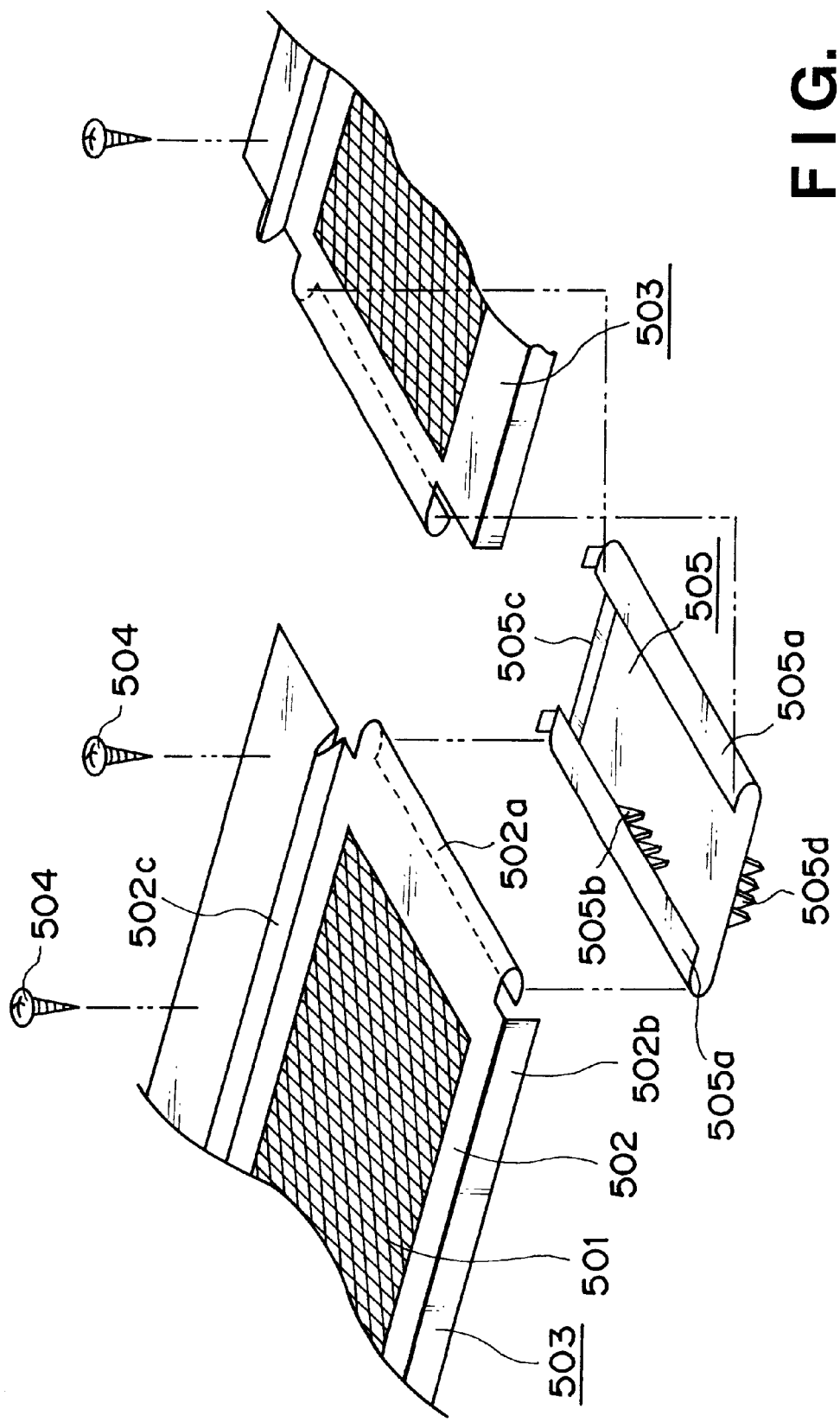
FIG. 5 is a perspective view for explaining a third embodiment of the present invention.

FIG. 5 shows an example when the present invention is applied to a stepping roof.

In FIG. 5, a solar cell element 501 is encapsulated on a metal sheet 502 in the same manner as described above to form solar panel roofing boards 503. A flap portion 502a for joining to another roofing board in the horizontal direction, a bent-down portion 502b which is bent downward so as to join to another roofing board in the direction of a flow of rainwater, and a rising portion 502c which rises from the surface of the metal sheet 502 are formed on the metal sheet 502 by drawing. The solar panel roofing board 503 is installed on the roof installation surface with a vis 504. Upon installation, two adjoining solar panel roofing boards 503 are connected by a connecting plate 505 formed by bending a metal sheet. The connecting plate 505 is necessary for weathering of the roof and commonly used to drain rainwater, falling in the space between roofing boards, and/or falling on the surface of roofing boards and subsequently blown into the space between the roofing boards by wind, by guiding the rainwater in a flow direction to prevent the rainwater from reaching the roof installation surface. Flap portions 505a are formed on both side edges of the connecting plate 505 so as to form a seam with the flap portions 502a of the solar panel roofing boards 503. Further, protuberances 505b having sharp tips for achieving electrical connection with the metal sheet 502 are formed on the edge of each flap portion 505a.

Figure 6:
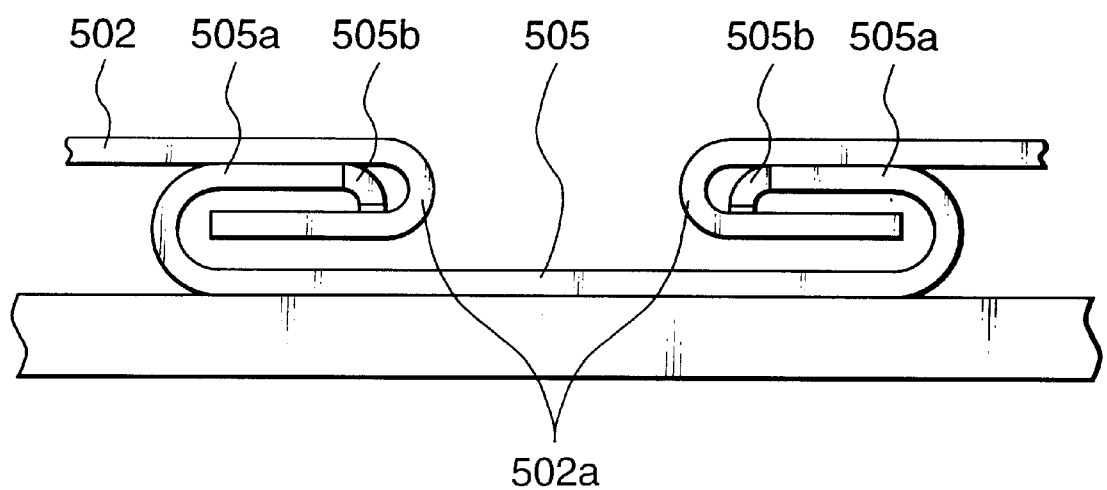
FIG. 6 is a side view for explaining a connection state of solar panel roofing boards.

An engagement state of the flap portions 502a and 505a is shown in FIG. 6. The protuberances 505b on the edge of the flap portion 505a are slightly longer than the gap between the edge of the flap portion 502a and the metal sheet 502; thus, when the flap portion 505a engages with the flap portion 502a of the metal sheet 502, the protuberances 505b scratch the surface of the metal sheet 502 as well as elastically deform, thereby achieving electrical connection between the metal sheet 502 and the connecting plate 505. The electrical connection is achieved in the same manner between the next solar panel roofing board 503 and the connecting plate 505. Further, the electrical connection is also achieved in the same manner via the connection plate 505 between the solar panel roofing board 503 and a general roofing board (see FIG. 8) made of a metal sheet having substantially the same shape as the solar panel roofing board 503 and between the general roofing boards.

The explanation continues with reference to FIG. 5. One end of the connecting plate 505 has a bent portion 505c which is bent upward. This is to prevent rainwater from flowing into the roof installation surface from a portion where the roofing boards are set in the upstream direction or over the connecting plates 505. Further, in the downstream of rainwater on the connecting plate 505, protuberances 505d which are bent downward are formed.

These protuberances 505d are to achieve electrical connection in the up-down direction with respect to the flow of rainwater, and the tips of the protuberances 505d are pressed against another connecting plate 505, the solar panel roofing board 503, or the general roofing board, which is in the lower row of the connecting plate 505.

Figure 7:
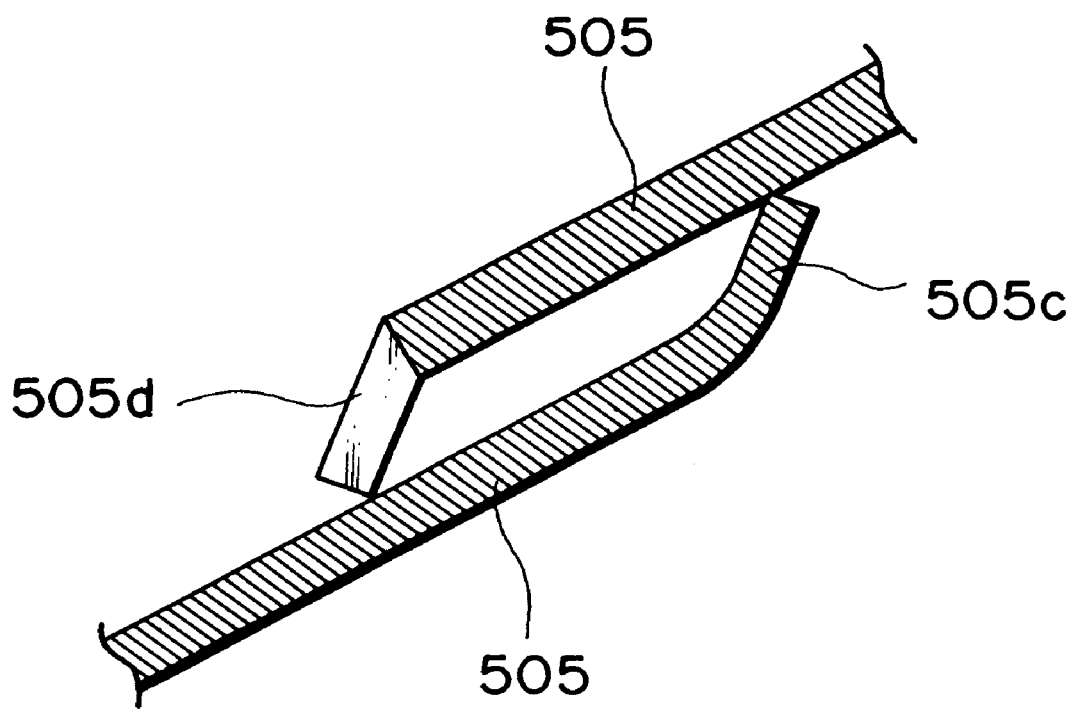
FIG. 7 is a cross-sectional view for explaining a connection state of roof connecting members shown in FIG. 5.

FIG. 7 is a cross-sectional view illustrating a connection state of connecting plates 505 shown in FIG. 5 in the flow direction of rainwater. Referring to FIG. 7, roofing boards are arranged so that the upper connecting plate 505 partially covers the lower connecting plate 505. In FIG. 7, the bent portion 505c of the lower connecting plate 505 touches the backside of the upper connecting plate 505 to secure resistance against water, and the protuberances 505d of the upper connecting plate 505 contact the lower connecting plate 505, thereby achieving electrical connection.

With the foregoing configuration, the solar panel roofing boards 503, the general roofing boards, and the connecting plates 505 come to have the same potential. Thus, by putting a ground electrode on one of these, it is possible to set the potential to ground potential; therefore, efficiency of grounding a roof improves.

Figure 8:
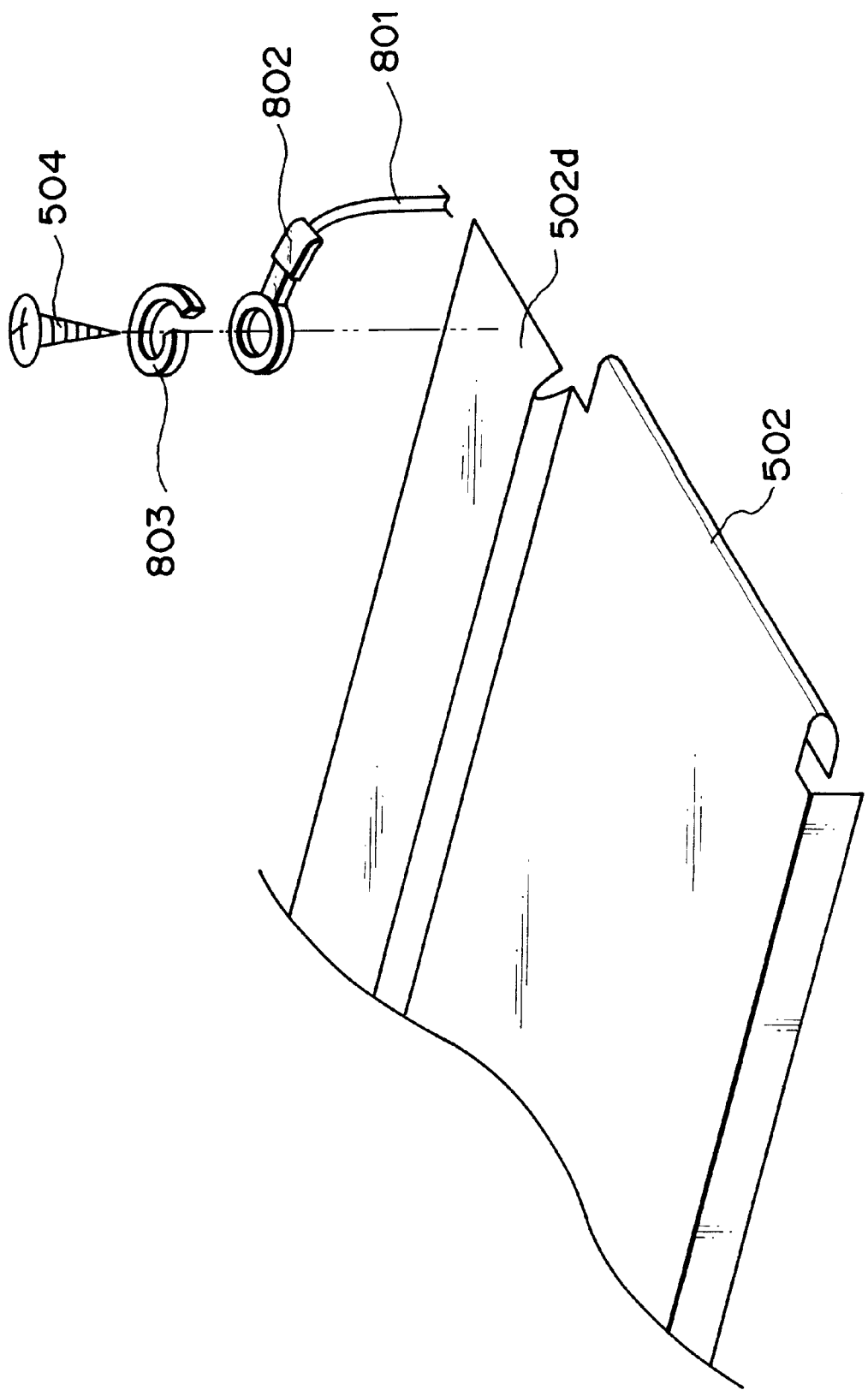
FIG. 8 is a perspective view illustrating an installation state of a ground wire according to the third embodiment of the present invention.

FIG. 8 shows a method for electrically connecting a ground wire 801 to a general roofing board, which is arranged in the rightmost position, for instance, with the vis 504. A round-shaped terminal 802 which is pressed against a wire 801 is connected to a portion 502d, hidden by the upper roofing board, of the metal sheet 502 (in this case, general roofing board) with a spring washer 803 and the vis 504. With this configuration, not only the metal sheet 502 to which the ground wire 801 is connected but also the other general roofing boards, solar panel roofing boards 503, and the connecting plates 505, which are joined to have the same potential, are set to ground potential.

Fourth Embodiment

Figure 9A:
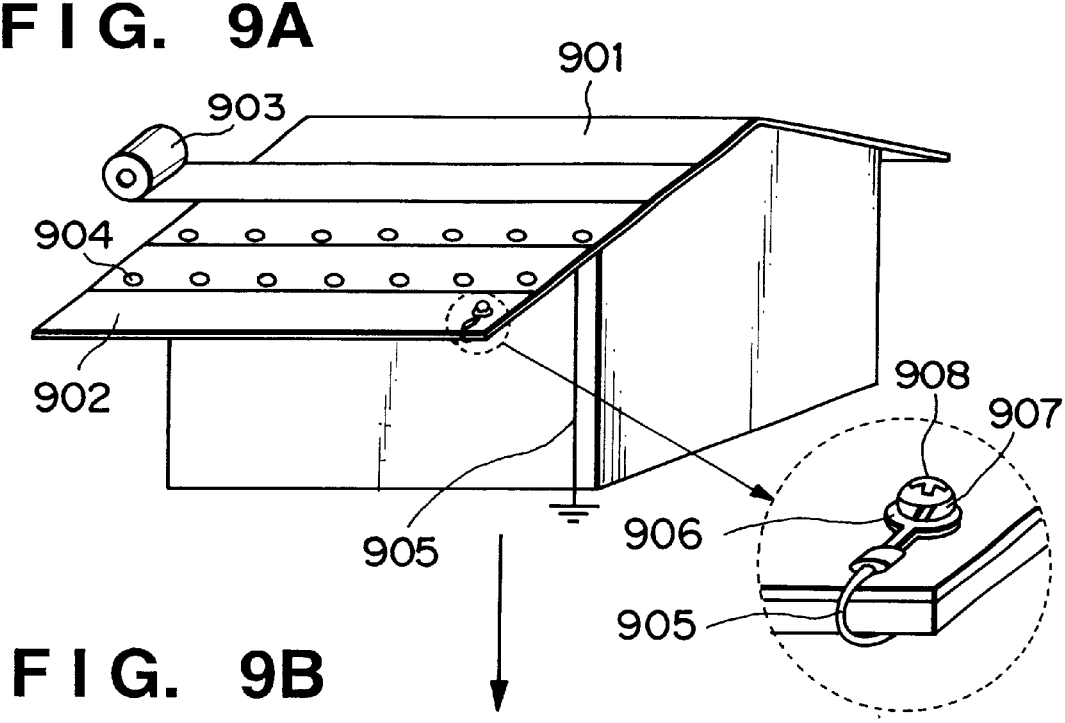
FIGS. 9A to 9C are perspective views showing a roofing sequence according to a fourth embodiment of the present invention.
Figure 9B:
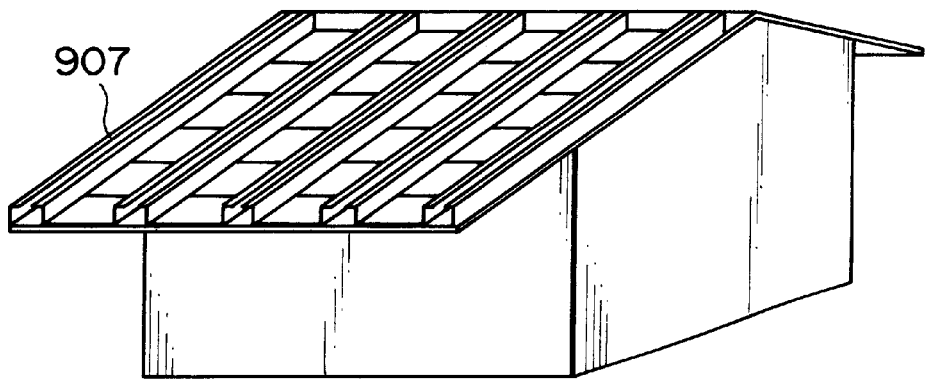
Figure 9C:
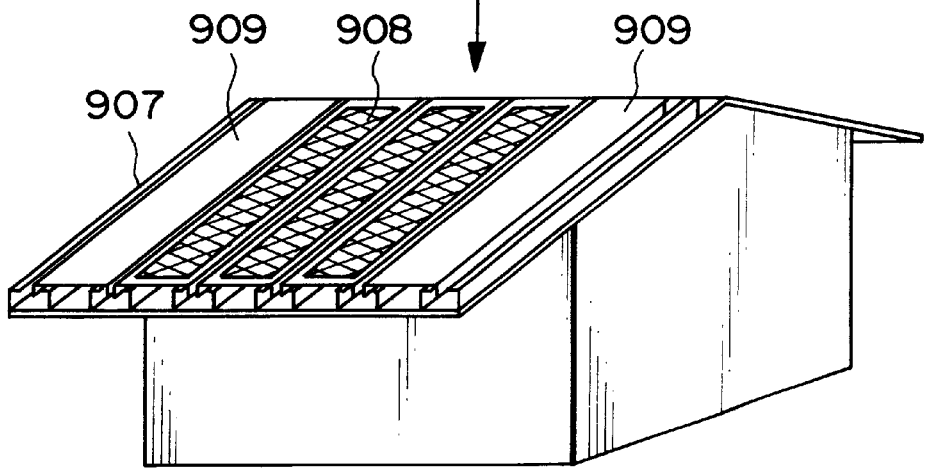

FIGS. 9A to 9C are perspective views showing a roofing sequence of another embodiment of the present invention.

In FIG. 9A, reference numeral 901 denotes a roof installation surface provided on the top of a house; 902, a steel sheet installed over substantially the entire surface of the roof installation surface 901; 903, a steel roll for providing the steel sheet 902; and 904, a vis for fixing the steel sheet 902 to the roof installation surface 901 and mechanically and electrically connecting the steel sheets 902. With the aforesaid configuration, the steel sheets 902 have the same potential. Thereafter, a pressing terminal 906 which is pressed against a ground wire 905 is fixed with a spring washer 907 and a vis 908 at the position suitable for connecting the ground wire 905 selected from the steel sheets 902. In addition to the above configuration, the other end of the ground wire 905 is connected to a ground potential; thereby the steel sheets 902 covering the roof installation surface 901 are grounded.

FIG. 9B shows a state when fixing members 907 having a similar shape to that of the fixing members 105 described in the first embodiment are arranged at predetermined intervals, and FIG. 9C shows a state in which the solar panel roofing boards 908 and general roofing board 909 having a similar shape and configuration as those explained in the first embodiment are connected and fixed. FIG. 10 shows a detailed installation state.

Referring to FIG. 10, a solar cell element 1001 of the solar panel roofing board 908 is encapsulated between a metal sheet 1002 and a light-transmitting protection film 1003 with resin filler 1004, and the solar panel roofing board 908 has curved portions 1002a on both sides symmetrically. Further, the fixing members 907 are placed and fixed on the roof installation surface 901 at predetermined intervals. To fix the solar panel roofing board 908 to the fixing member 907, the curved portion 1002a deforms elastically as it extends over a bent portion 1005a of the fixing member 105 and is settled at a position as FIG. 10 shows.

With the foregoing configuration, the solar panel roofing board 908 is fixed to the fixing member 907; however, only with the aforesaid fixing method, noise and vibration would be caused by wind since there is a gap between the solar panel roofing board 908 and the fixing member 907. Therefore, a member for reducing noise and vibration is introduced. The member is a helical compression spring denoted by 1007 in FIG. 10, and the spring 1007 is fixed to the steel sheet 902 at the fixed portion 1007a with a vis 1008 before the solar panel roofing board 908 is installed. When the solar panel roofing board 908 is installed on the fixing member 907 in the aforesaid method, the spring 1007 is pressed against the backside of the metal sheet 1002 of the solar panel roofing board 908. Since the spring 1007 pushes up the solar panel roofing board 908, the noise and vibration are prevented.

In addition, by making the end portion 1007b of the spring 1007 which contacts the metal sheet 1002 sharp, it is possible to achieve electrical connection between the spring 1007 and the metal sheet 1002. Since the fixing portion 1007a of the spring 1007 is electrically connected to the steel sheet 902 as seen in FIG. 10, the metal sheet 1002 comes to have the same potential as that of the steel sheet 902 via the spring 1007. By applying the aforesaid configuration to each solar panel roofing board 908 and each general roofing board 909 which are to be mounted on the roof, the entire roof has the same potential as that of the steel sheets 902 which are set underneath the roofing boards. Note, reference numerals 905 to 908 shown in FIG. 10 are a wire, round-shaped terminal, spring washer, and vis, respectively, which have the same configuration as those shown in FIG. 9 and have a function to make the steel sheets 902 set to ground potential.

Fifth Embodiment

Figure 11:
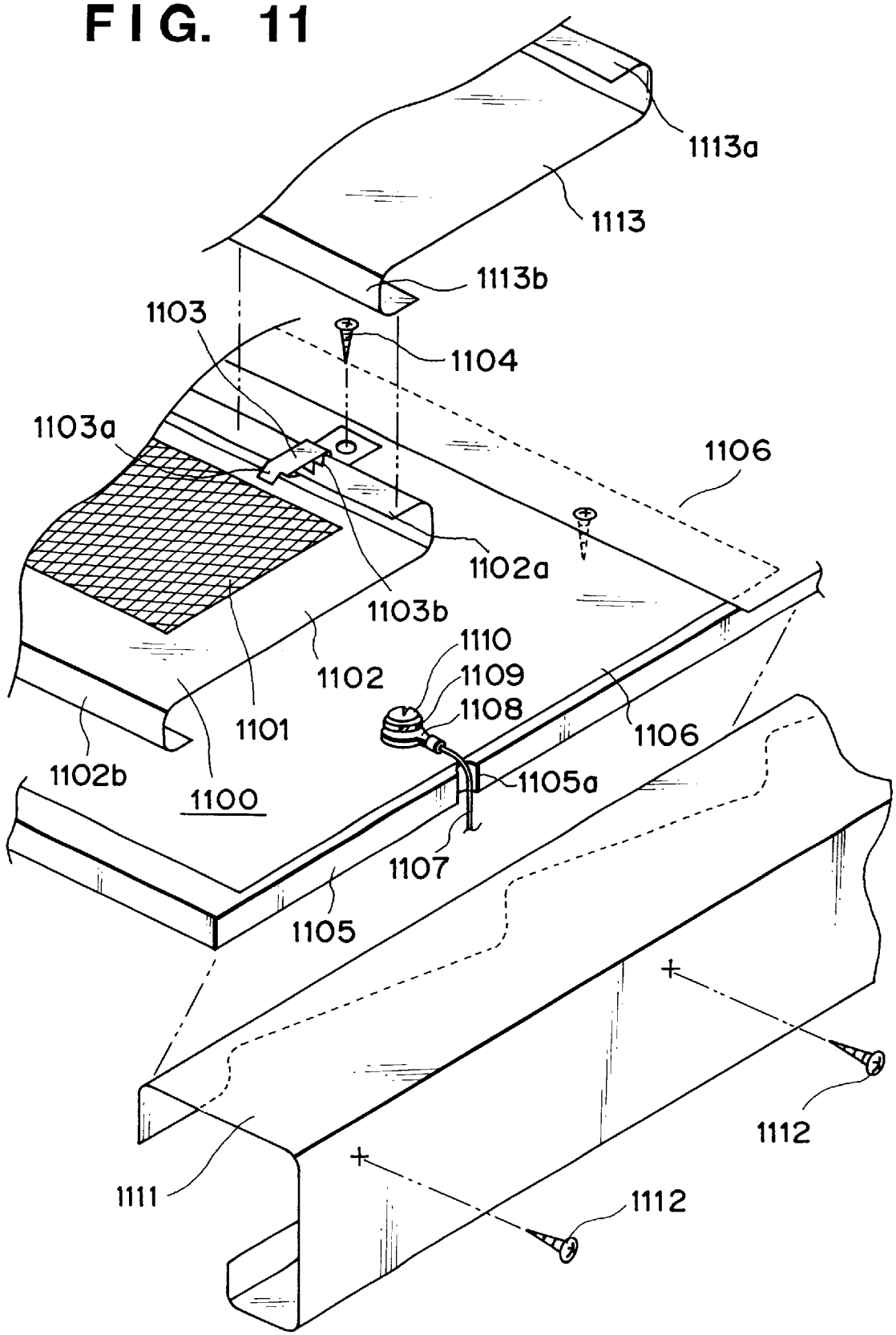
FIG. 11 is a cross-sectional view for explaining a fifth embodiment of the present invention.

FIG. 11 shows an embodiment when the present invention is applied to a stepping roof. FIG. 11 shows a border between a portion roofed with solar panel roofing boards 1100 and a portion roofed with general roofing boards 1113. In FIG. 11, reference numeral 1101 denotes a solar cell element; 1102, a metal sheet; and 1113, the general roofing board, made of a metal sheet, which does not include a solar cell.

Reference numerals 1102a and 1102b are bent portions on the upper and lower edge, of the metal sheet 1102, and the bent portion 1102a engages with a metal clip 1103 and is fixed on a roof installation surface 1105 with a vis 1104. The bent portion 1102b engages with an engaging portion 1103a, which is formed to stick out from the clip 1103 for fixing the adjoining lower roofing board to seam.

The general roofing board 1113 has bent portions 1113a and 1113b, similar to the metal sheet 1102. The bent portion 1113a is to be set on the roof installation surface 1105 with the clip 1103, and the bent portion 1113b is to engage with the engaging portion 1103a of the clip 1103.

Further, protuberances 1103b are formed on the clip 1103 at the portion which contacts the bent portion 1102a by folding to achieve electrical connection between the clip 1103 and the metal sheet 1102. Further, the clip 1103 is also electrically connected to a steel sheet 1106 via the vis 1104 for fixing the clip 1103 to the roof installation surface 1105 or by direct connection to the steel sheet 1106.

Similar to the above embodiments, when the aforesaid members form a roof on steel sheets 1106 which are arranged on the roof installation surface 1105 and connected to each other, those members come to have the same potential. Accordingly, it becomes possible to easily set the entire roof to the ground voltage via a wire 1107 which is provided at an arbitrary portion of one of the steel sheets 1106 with a round-shaped terminal 1008, a spring washer 1009, and a vis 1100. In the fifth embodiment, the wire 1007 is connected at an edge portion of the roof installation surface 1105 which is shielded by a covering member 1111 for covering a gable of the roof configured with the aforesaid roofing boards. The covering member 1111 is fixed on the side edge of the roof installation surface 1005 with a vis 1112 and covers up the portion where the ground wire 1107 is connected; however, by unscrewing the vis 1112 and removing the covering member 1111, the ground wire 1107 can be exposed to check its connection state for maintenance.

Sixth Embodiment

Figure 12:
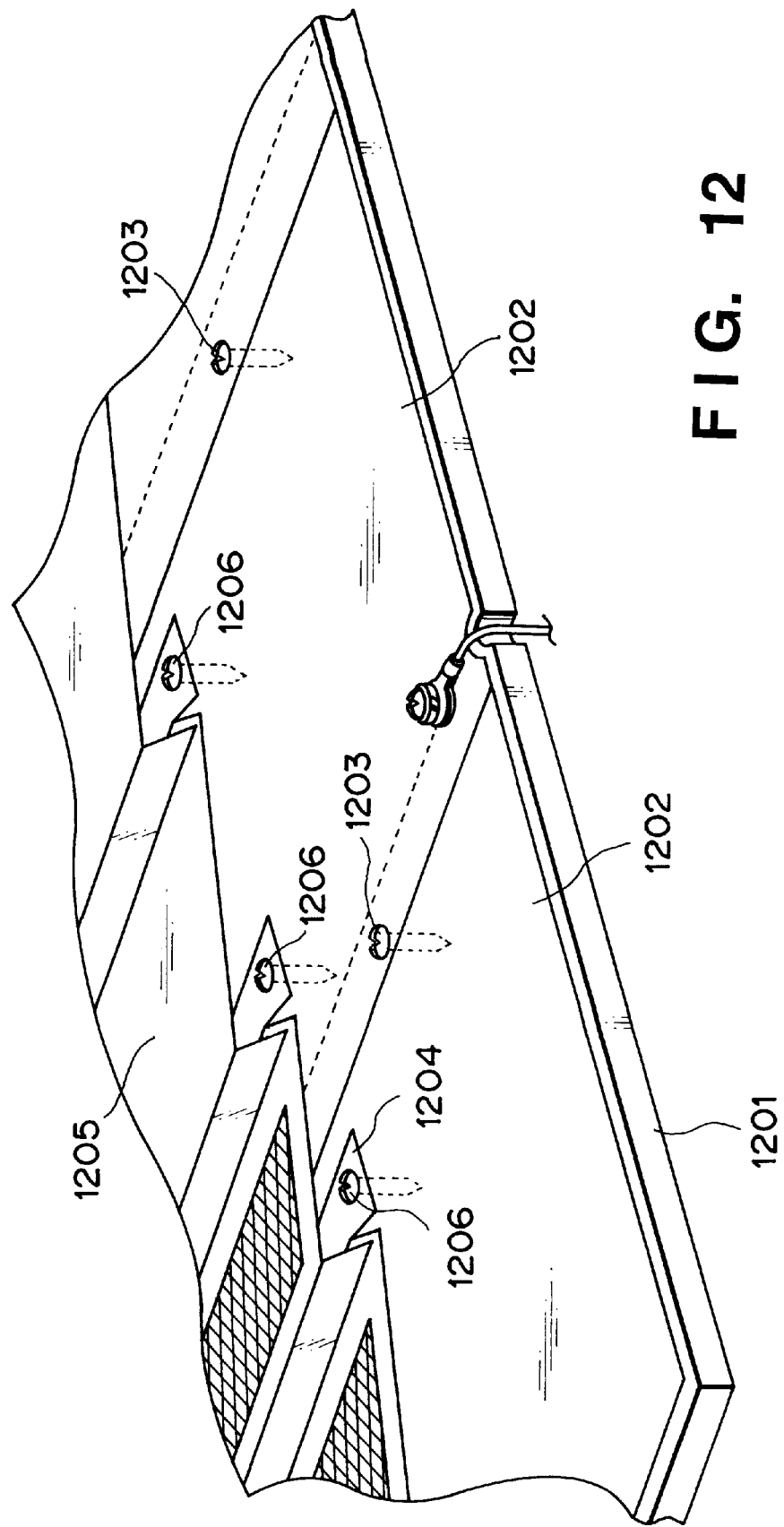
FIG. 12 is a cross-sectional view for explaining a sixth embodiment of the present invention.

FIG. 12 shows an example when the present invention is applied to another stepping roof.

Solar panel roofing boards and general roofing boards according to a sixth embodiment are the same as those used in the third embodiment; however, in the sixth embodiment, steel sheets 1202 are spread over a roof installation surface 1201 before installing a roof, and the steel sheets 1202 are fixed and connected mechanically and electrically to each other using vises 1203.

For fixing solar panel roofing board 1204 or general roofing board 1205, vises 1206 are used, similar to the aforesaid embodiments, and the vises 1206 realize electrical connection of metal sheets of the solar panel roofing boards 1204 and the general roofing boards 1205 to the steel sheets 1202.

With the above configuration, the solar panel roofing boards 1204, the general roofing boards 1205, and the steel sheets 1202 comes to have the same potential, similar to the above embodiments. Further, a ground wire is easily connected at an arbitrary position of one of the steel sheets 1202 similar to the above embodiments. Thus, detailed explanation is omitted here.

Seventh Embodiment

Figure 13:
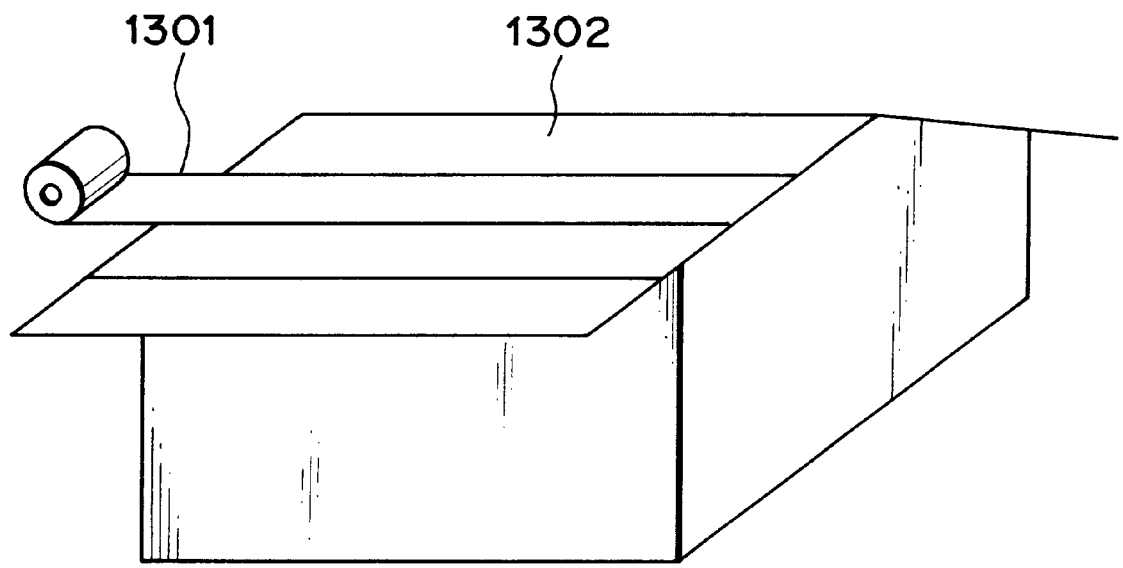
FIG. 13 is a cross-sectional view for explaining a seventh embodiment of the present invention.

FIG. 13 is an example when a conductive waterproof material is used in place of the steel sheet 1106 which is explained in the fifth embodiment with reference to FIG. 11. In FIG. 13, reference numeral 1301 denotes a waterproof material having water resistance as well as conductive characteristics, and it is arranged before installing a roof on a roof installation surface 1302.

Figure 14:
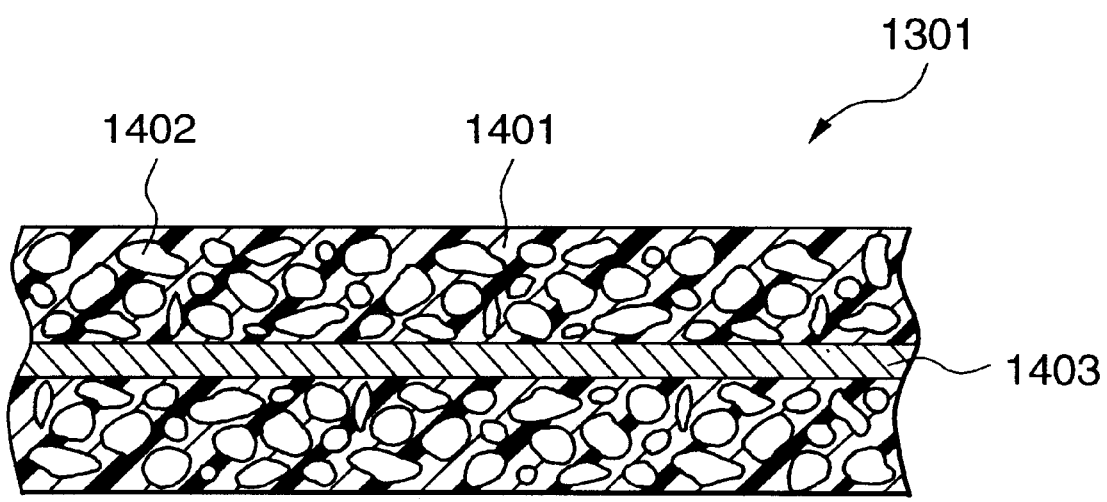
FIG. 14 is a view showing a structure of a conductive waterproof material according to the seventh embodiment of the present invention.

FIG. 14 shows an example of the conductive waterproof material 1301 which is made by impregnating or coating a reinforcing material 1403, such as woven fabric cloth, nonwoven fabric cloth, or net, with a mixture of asphalt 1401 and metal powder 1402. With this configuration, although resistance is, higher than metal, it is possible to give conductive characteristics caused by contact between particles of the metal powder 1402.

Figure 15:
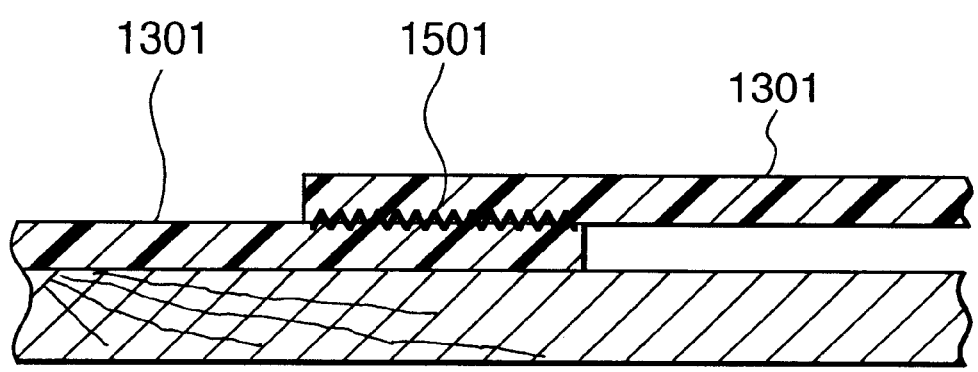
FIG. 15 is a view showing a connection state of the conductive anti-water material according to the seventh embodiment of the present invention.

FIG. 15 is a cross-sectional view showing a state in which two sheets of conductive waterproof material 1301 are overlapped. Right after the two sheets of the conductive waterproof material 1301 are overlapped, since their surfaces only touch one another, resistance between the two sheets of the conductive waterproof material 1301 is very high. However, heat caused by the sunlight incident after installation, heat of the sunlight incident on the roofing boards after installation, and heat of a heater in the house softens the asphalt 1401, and the overlapped portion is adhered to form an adhered surface 1501 of low resistance. Accordingly, the conductive waterproof material 1103 needs to be fixed by a tacker for lightly fixing the material 1103 on the roof installation surface 1302. Further, plural sheets of the conductive waterproof material 1103 are electrically integrated without using connecting means, such as a vis, used to connect steel sheets 1106 in the fifth embodiment.

Note, the photovoltaic power generation roof which is installed over the conductive waterproof material 1103 is the same as those explained in the fifth and sixth embodiments; therefore, detailed explanation of it is omitted.

Eighth Embodiment

FIG. 16 shows a photovoltaic power generation roof having the same configuration as that shown in FIG. 11 in the fifth embodiment; however, the following is different.

First, the steel sheets 1106 are not only spread over the roof installation surface 1105 but also bent in the side portions of the roof installation surface 1105. Second, the side member 1111 is not only provided on the side portions of the roof installation surface 1106 with the vises 1112 but also electrically connected to the steel sheet 1106 via the vises 1112 which are made to pass through the steel sheet 1106. Third, the ground wire 1107 connected to one of the steel sheets 1106 in the fifth embodiment is connected to the side member 1111 in the eighth embodiment.

With the aforesaid configuration, the solar panel roofing boards 1110, the general roofing boards 1113, the clips 1103, and the side members 1111 come to have the same potential. Accordingly, by setting the ground wire 1107 to the side member 1111, the aforesaid entire configuration is set to ground potential. In this case, it is apparently easy to check the connecting portion of the ground wire 1107 for maintenance.

In a photovoltaic power generation roof including solar panel roofing boards and general roofing boards which do not include a solar cell, by electrically connecting the solar panel roofing boards and the general roofing boards or by electrically connecting the roofing boards via conductors provided between the roofing boards and a roof installation surface to make the entire roof to be of the same potential, it is possible to set all the roofing boards to ground potential by connecting one of the roofing boards or conductors to a ground wire. Accordingly, limitation of the position of the ground electrode, such that the ground electrode should be on the backside of or near a solar panel roofing board, is removed, and the ground electrode may be set at an arbitrary position. Thus, it is possible to make a ground electrode at an advantageous position, and, further, to omit a wire connecting the roofing boards.

Furthermore, since it is possible to arrange a ground electrode on a general roofing board other than solar panel roofing boards, the ground electrode may be arranged on the general member used for covering the eaves, gable, and ridge, for instance; accordingly, checking and maintenance of the ground electrode after the installation, which have been impossible or difficult to do, become easy; thus, it is very advantageous in terms of electrical security.

Further, a metal sheet roof which has been used for securing fire resistance is used as a conductor for setting the entire roof to the same potential; therefore, it is possible to make good use of the cost of the material for the metal sheet roof, which has been a considerable expense.

As many apparently widely different embodiments of the present invention can be made without departing from the spirit and scope thereof, it is to be understood that the invention is not limited to the specific embodiments thereof except as defined in the appended claims.

What is claimed is:

1. A solar panel roof having a portion configured with a first roofing board with integrated solar cells, said first roofing board having a conductive portion which is isolated from the integrated solar cells, and a portion configured with a second roofing board without any solar cell, said second roofing board having a conductive portion, comprising a conductive part for electrically connecting the conductive portions of said first and second roofing boards.

2. The roof according to claim 1, wherein said first and second roofing boards are fixed on a roof installation surface via a roofing board fixing member and/or a roofing board connecting member which functions as the conductive part.

3. The roof according to claim 2, wherein said first and second roofing boards are fixed on said roof installation surface with said roofing board fixing member and wherein said roofing board fixing member is a metal clip.

4. The roof according to claim 2, wherein said first and second roofing boards are fixed on said roof installation surface with said roofing board fixing member and wherein said roofing board fixing member is a metal vis.

5. The roof according to claim 2, wherein said first and second roofing boards are fixed on said roof installation surface with said roofing board fixing member and wherein said roofing board fixing member is a metal spring.

6. The roof according to claim 2, wherein said first and second roofing boards are fixed on said roof installation surface with said roofing board connecting member and wherein said roofing board connecting member is a conductive connecting plate.

7. The roof according to claim 2, wherein the conductive portions of said first and second roofing boards are electrically connected by making a metal substrate, which comprises the conductive portion of said first roofing board, be in contact with a protuberance formed on said roofing board fixing member or said roofing board connecting member.

8. The roof according to claim 2, wherein said roofing board fixing member or said roofing board connecting member is grounded.

9. The roof according to claim 1, further comprising a conductive member arranged between said first and second roofing boards and a roof installation surface, wherein the conductive portions of said first and second roofing boards are electrically connected via said conductive member.

10. The roof according to claim 9, wherein said conductive member is a metal sheet.

11. The roof according to claim 9, wherein said conductive member is a conductive waterproof material.

12. The roof according to claim 9, wherein said conductive member is grounded.

13. The roof according to claim 1, wherein said second roofing board is grounded.

14. The roof according to claim 1, wherein a covering member whose potential is set to be the same as the conductive portion of said first roofing board is grounded.

15. A roofing method for a solar panel roof having a portion configured with a first roofing board with integrated solar cells, said first roofing board having a conductive portion which is isolated from the integrated solar cells, and a portion configured with a second roofing board without any solar cell, said second roofing board having a conductive portion, comprising the step of setting the conductive portions of said first and second roofing boards so as to be at the same potential.

16. The method according to claim 15, further comprising a step of grounding said roof at a portion other than the integrated solar cells of said first roofing board.

17. A solar power generation system comprising:

a solar panel roof having a portion configured with a first roofing board with integrated solar cells, said first roofing board having a conductive portion which is isolated from the integrated solar cells, and a portion configured with a second roofing board without any solar cell, said second roofing board having a conductive portion; and a power conversion apparatus for converting direct current power provided from the solar cell into alternating current power, wherein the conductive portions of said first and second roofing boards are electrically connected via a conductive member.

18. The system according to claim 17, wherein said roof is grounded at a portion other than the integrated solar cells of said first roofing board.

* * * * *

UNITED STATES PATENT AND TRADEMARK OFFICE
CERTIFICATE OF CORRECTION

PATENT NO. : 6,323,478 B1
DATED : November 27, 2001
INVENTOR(S) : Tatsuo Fujisaki et al.

It is certified that error appears in the above-identified patent and that said Letters Patent is hereby corrected as shown below:

<u>Title page,</u>
Item [75], Inventors, "Tanabe" (all three occurrences) should read -- Kyotanabe --.

<u>Column 1,</u>
Line 23, "he" should read -- the --; and
Line 44, "is" should read -- as --.

<u>Column 4,</u>
Line 56, "Ares" should read -- are --; and
Line 66, "ard" should read -- and --.

<u>Column 7,</u>
Line 26, close up right margin; and
Line 27, close up left margin.

<u>Column 8,</u>
Line 30, "member 105" should read -- member 907 --.

<u>Column 9,</u>
Line 65, "comes" should read -- come --.

<u>Column 10,</u>
Line 17, "is," should read -- is --;
Lines 31, 32, 34 and 39, "material 1103" should read -- material 1301 --;
Line 58, "boards 1110," should read -- boards 1100, --.

Signed and Sealed this

Ninth Day of July, 2002

Attest:

JAMES E. ROGAN
Attesting Officer  Director of the United States Patent and Trademark Office